United States Patent [19]

Tamai et al.

[11] Patent Number: 5,262,775
[45] Date of Patent: Nov. 16, 1993

[54] NAVIGATION SYSTEM WITH OFF-ROUTE DETECTION AND ROUTE RECALCULATION

[75] Inventors: Haruhisa Tamai, Sunnyvale, Calif.; Tatsuhiko Abe, Saitama, Japan

[73] Assignee: Zexel Corporation, Tokyo, Japan

[21] Appl. No.: 864,515

[22] Filed: Apr. 7, 1992

[51] Int. Cl.⁵ ............................................ G08G 1/123
[52] U.S. Cl. .................................. 340/995; 340/988; 364/449
[58] Field of Search ....................... 340/990, 995, 988; 73/178 R; 364/449, 444

[56] References Cited

U.S. PATENT DOCUMENTS

| | | | |
|---|---|---|---|
| 4,763,270 | 8/1988 | Itoh et al. | 340/990 |
| 4,954,959 | 9/1990 | Moroto et al. | 340/995 |
| 4,992,947 | 2/1991 | Nimura et al. | 340/995 |
| 5,031,104 | 7/1991 | Ikeda et al. | 340/990 |
| 5,043,902 | 8/1991 | Yokoyana et al. | 340/995 |
| 5,115,399 | 5/1992 | Nimura et al. | 340/990 |

*Primary Examiner*—Brent Swarthout
*Attorney, Agent, or Firm*—Thomas R. Morrison

[57] ABSTRACT

Where a vehicle deviates from a calculated optimal route, the system displays a message indicating the vehicle's deviation. The driver of the vehicle commands computation of a new optimum route. The system selects a new starting point from a point substantially ahead of the vehicle, recomputes the optimal route, and determines the route from the new starting point to the destination. The new starting point is far enough ahead of the vehicle to ensure that the route computation is completed before the vehicle reaches it. This prevents overrunning the new starting point before the calculation of a new optimum route is completed. Navigation guidance, computed for the new optimal route, is then displayed.

7 Claims, 4 Drawing Sheets

NAVIGATION SYSTEM WITH OFF-ROUTE DETECTION AND ROUTE RECALCULATION

BACKGROUND OF THE INVENTION

The present invention relates to a vehicle navigation system, and, more particularly, to a system for computing an optimal route from a starting point to a destination and for guiding a vehicle according to the computed optimal route.

Generally, a vehicle navigation system computes the optimal route to a destination before the vehicle starts its journey. En route, the system computes local directions along the optimal route with reference to the vehicle's present location in real time. The system guides the vehicle's navigation from a starting point to a destination by displaying route information in real time on a CRT.

When a vehicle travels, it sometimes deviates from the optimal route. For example, assume a vehicle is traveling on a road in a particular direction. A route guidance display instructs the driver to turn right where the road he is on intersects a second road at right angles. However, the driver cannot make the turn because the second road is under construction. In such a case, the driver is forced to travel straight along the road he is on, without turning to the right at the next intersection. Thus the vehicle has deviated from the optimal route.

Under such circumstances, conventional navigation systems take the vehicle's present location as the starting point and recompute a new optimal route from the new starting point to the destination. A conventional navigation system thereafter guides local navigation along the recomputed optimal route.

Computation of an optimal route generally requires several seconds. Therefore, when a vehicle keeps on traveling after it has deviated, it moves forward by distance L from the new starting point during the time the new optimal route is computed, where L is given by the equation $$L = V \times T,$$

where V = the velocity of the vehicle and T = the time to compute the new optimal route.

Should the recomputed optimal route require a right turn at a second intersection where the road currently traveled intersects a third road, the vehicle has passed through the second intersection if the distance between the first and second intersections is shorter than the distance L. As a result, the vehicle is once more off the optimal route, which must be again recomputed. The difficulties caused by having to recompute successive optimal routes create drawbacks for the conventional navigation system.

OBJECTS AND SUMMARY OF THE INVENTION

An object of the present invention is to provide a navigation system that overcomes the drawbacks of the prior art.

A further object of the present invention is to provide a navigation system that can prevent an additional deviation from the optimal route and the resulting recomputation, once a first recomputation of an optimal route has been completed after the vehicle has deviated from the original optimal route.

Still a further object of the present invention is to provide a navigation system that recomputes a new optimal route no more than once for any single deviation from an original optimal route.

Briefly stated, the present invention provides a vehicle navigation system in which, where a vehicle has deviated from a calculated optimal route, the system displays a message indicating the vehicle's deviation. When the driver of the vehicle responds to the message by turning on a route computing command switch, the system determines a new starting point, recomputes the optimal route, and determines the route from the vehicle's present location to the new starting point. Navigation guidance, computed for the new optimal route, is displayed.

According to an embodiment of the invention, a vehicle navigation system comprises means for storing and retrieving a plurality of map data, the means for storing containing the map data, first detecting means for detecting a present location of a vehicle, first computing means for computing from the map data an optimal route for the vehicle from a starting point to a destination, second detecting means for detecting deviation of the vehicle from the optimal route, the second means for detecting cooperating with the first means for detecting, means for displaying, the means for displaying disposed to convey information that the vehicle has deviated from the optimal route, means for commanding computation of a route, means for determining a geographic point separated from the vehicle's present location and ahead of the vehicle, the means for determining cooperating with the means for commanding, the means for determining communicating the geographic point as a new starting point to the first computing means, second computing means for computing navigation guidance, the second computing means cooperating with the first computing means, and the second computing means communicating the navigation guidance to the means for displaying.

According to a feature of the invention, recomputation of the optimal route takes place automatically without driver intervention whenever the navigation system detects that the vehicle has deviated from the original optimal route.

According to another feature of the invention, a vehicle navigation system comprises a CD ROM for storing and retrieving a plurality of map data, the CD ROM containing the map data, a shaft sensor, a terrestrial magnetism sensor, the shaft sensor and the terrestrial magnetism sensor cooperating to detect a present location of a vehicle, a microcomputer for computing from the map data an optimal route for the vehicle from a starting point to a destination, the shaft sensor, the terrestrial magnetism sensor, and the microcomputer cooperating to detect a deviation of the vehicle from the optimal route, a CRT display disposed to convey information that the vehicle has deviated from the optimal route, a touch-screen switch to command computation of a route, the CD ROM and the microcomputer cooperating, in response to the touch-screen switch, to determine a geographic point separated from the vehicle's present location and ahead of the vehicle, whereby the geographic point becomes a new starting point to for a new optimal route, the microcomputer disposed to compute navigation guidance in cooperation with the CD ROM, and the microcomputer communicating the navigation guidance to the CRT for display thereon.

To summarize, according to the present invention, an optimal route computing means computes for a vehicle, based on map data extracted from a map data storage means, an optimal route from a starting point to a destination. In accordance with the computed optimal route and the vehicle's present location, detected by a present location detecting means, a deviation detecting means detects whether the vehicle is off or on the optimal route.

Where the vehicle has deviated from the optimal route, signals from the deviation detecting means cause a display to show the driver that the vehicle is off the optimal route.

When the driver, having seen the information, turns on a route computing switch, a geographic point/route setting means defines a geographic point in the forward direction of the vehicle and the route from the present location to the geographic point. The geographic point/route setting means then sends the coordinates of the geographic point to the optimal route computing means, which takes them as the coordinates of the new starting point. The optimal route computing means computes the new optimal route from the new starting point to the destination from the map data.

Meanwhile, a navigation guidance computing means computes, and forwards for display, information regarding the route from the vehicle's present location to the point which is to be the new starting point.

According to another embodiment of the present invention, the optimal route computing means computes, based on map data extracted from the map data storage means, the optimal route from a starting point to a destination. Based on this computed optimal route and the vehicle's present location detected by the present location detecting means, the deviation detecting means determines whether the vehicle is off the optimal route.

When the deviation detecting means determines that the vehicle has deviated from the optimal route, the navigation guidance computing means defines a geographic point in the forward direction of the vehicle and the route from the present location to the geographic point. The navigation guidance computing means then sends the coordinates of the geographic point to the optimal route computing means, which takes them as the coordinates of the new starting point. The optimal route computing means computes the optimal route from the new starting point to the destination from the map data.

Meanwhile, the navigation guidance computing means computes, and outputs for display, information about the route from the vehicle's present location to the new starting point.

The above, and other objects, features and advantages of the present invention will become apparent from the following description read in conjunction with accompanying drawings, in which like reference numerals designate the same elements.

BRIEF DESCRIPTION OF THE DRAWINGS

FIG. 6(A) represents an example of local navigation guidance. FIG. 6(B) represents an example of information that indicates that a vehicle is off the optimal route. FIGS. 6(C) and 6(D) respectively represent examples of navigation guidance messages.

DETAILED DESCRIPTION OF THE PREFERRED EMBODIMENTS

Figure 1:
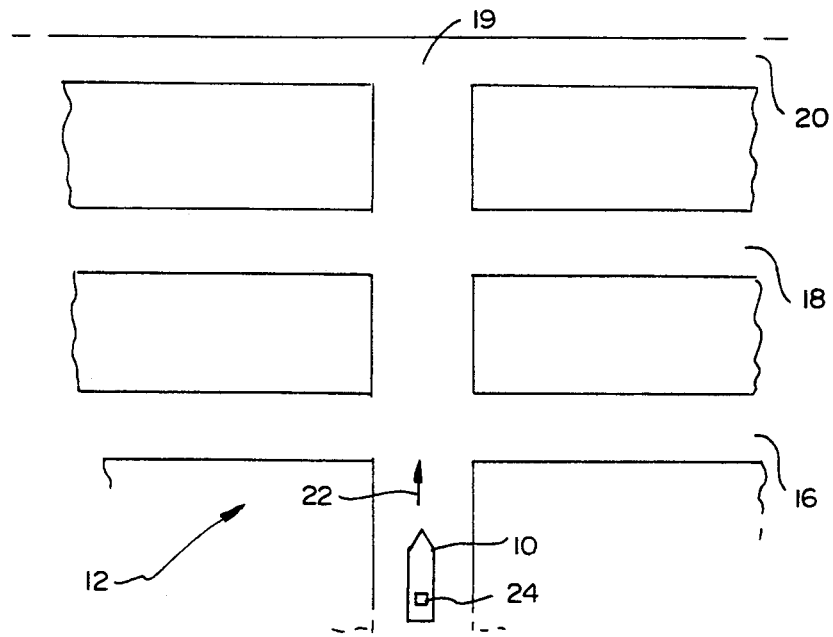
FIG. 1 is a simplified plan view of a vehicle moving over a road network. The vehicle has installed a navigation system of the present invention.

Referring to FIG. 1, a vehicle 10 moves over a road network 12, consisting of a plurality of roads 14–20, in the direction shown by an arrow 22. Road 14 intersects road 20 at intersection 19. Vehicle 10 has installed therein a navigation system 24 that contains the apparatus of the present invention.

Figure 2:
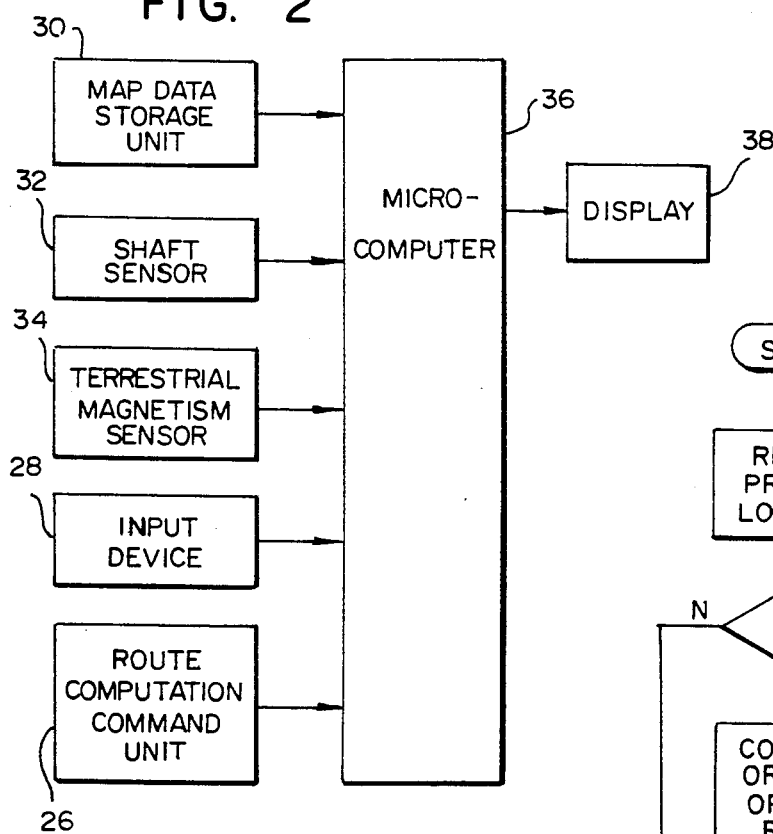
FIG. 2 is a block diagram of an embodiment of the system of the present invention.

Referring to FIG. 2, a driver of vehicle 10 initiates computation of an optimal route in navigation system 24 by instructing a route computation command unit 26. Together with the instruction to compute, the driver enters route data through input device 28. This data always specifies a destination; it may or may not specify a starting location. From two inputs: map data, retrieved from a map data storage unit 30, and either present location data, communicated from a shaft sensor 32 and a terrestrial magnetism sensor 34, or a specified starting location, entered by the driver into input device 28, a microcomputer 36 computes the optimal route. Microcomputer 36 also computes guidance for following the optimal route. The guidance is sent to display 38 for presentation to the driver.

Map data storage unit 30 may be any convenient device capable of storing an appropriate amount of data, and retrieving selected parts of the data in an appropriate time. For example, map data storage unit 30 may be a CD-ROM or an IC card with map data written thereon, the map data including road network data and address data. Shaft sensor 32 communicates signals that correspond to rotation of a shaft. Terrestrial magnetism sensor 34 detects the direction of the terrestrial magnetic field. Microcomputer 36 computes distance travelled by vehicle 10 based on signals from shaft sensor 32 and a forward direction of vehicle 10 computed from signals from terrestrial magnetism sensor 34. Display 38 is comprised of a CRT or other means for displaying data from microcomputer 36.

Figure 6A:
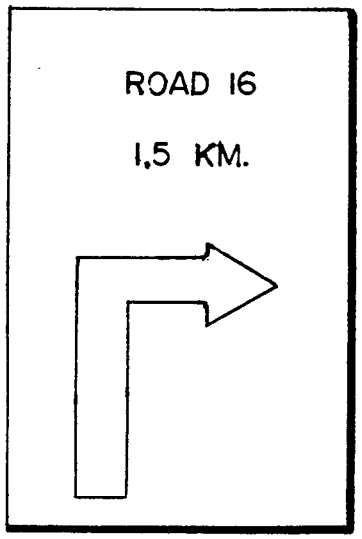
FIGS. 6(A) through 6(D) shows the information displayed on the screen of the display in the system of the present invention.
Figure 6B:
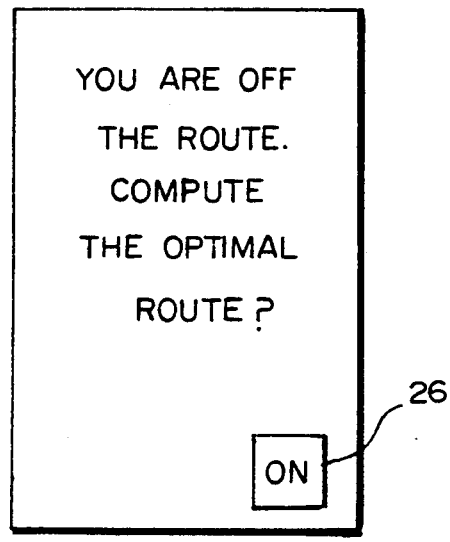

As shown in FIG. 6(B), route computation command unit 26 may be in the form of a touch-sensitive key on the screen of display 38.

The present location of vehicle 10 may also be computed from GPSS (Global Positioning System with Satellite) using three or four satellites, or from LO-RAN.

Microcomputer 36 also computes, based on map data from map data storage unit 30, the optimal route from a starting point to a destination. The optimal route is computed to minimize the time or the distance from a starting point to a destination or to require the fewest number of right and left turns.

A starting point may be entered from input device 28. However, in this embodiment the present location of vehicle 10, or a geographic point whose relation to the present location is determined in the manner described below, is vehicle 10's starting point. Of course, the destination of vehicle 10 is entered through input device 28.

Microcomputer 36 computes route information for an optimal route and sends the information to display 38. Display 38 then presents the information as an image on the screen. In this "route information" means whatever information is necessary to guide vehicle 10 from its starting point to its destination along an optimal route. In the present embodiment, route information to be displayed comprises, as shown in FIG. 6(A), the name of the road to which vehicle 10 should proceed to as soon as it leaves the road currently traversed (e.g., Road 16 as in FIG. 6(A)), a distance between vehicle 10's present location and the next road (e.g., 1.5 km.), and an arrow representing the direction to take to turn into the next road. Route information is continuously re-computed and updated from the present location of vehicle 10 as it travels. Under normal conditions, an image on display 38 is updated immediately after vehicle 10 proceeds into the road whose name has just been displayed.

Local navigation guidance is thus presented from vehicle 10's starting point to the destination by repeating the above procedure. However, display of the distance from the present location of vehicle 10 to the next road is updated only at specified intervals, for example, every 500 m, according to the present embodiment.

Further, route information need not be limited to a road name, a distance, and an arrow, as shown in FIG. 6. It may include other information in addition thereto, or it may instead comprise entirely different information. The display may be voice instead of image, or voice and image may be jointly presented.

Microcomputer 36 also determines, based on vehicle 10's present location and its present optimal route, whether vehicle 10 is on or off the optimal route.

Figure 3:
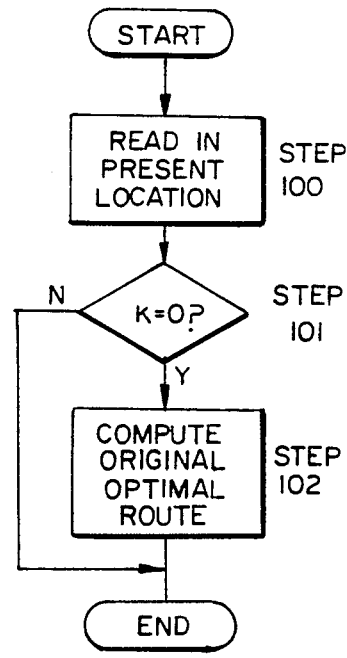
FIG. 3 is a flow chart illustrating the steps of computing the original optimal route.
Figure 4:
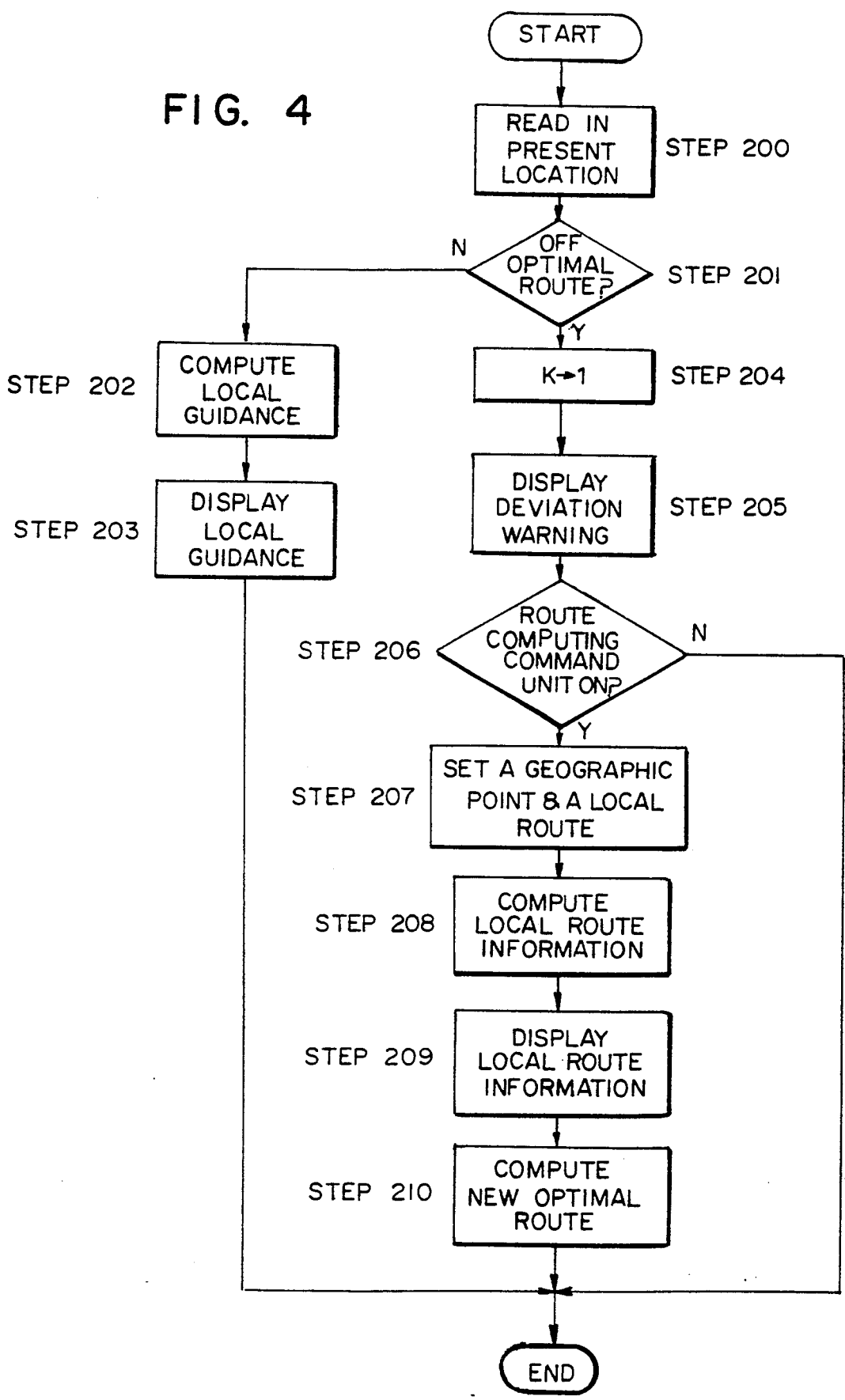
FIG. 4 is a flow chart illustrating the steps of computing local navigation guidance and an optimal route when a vehicle is off the original optimal route.
Figure 5:
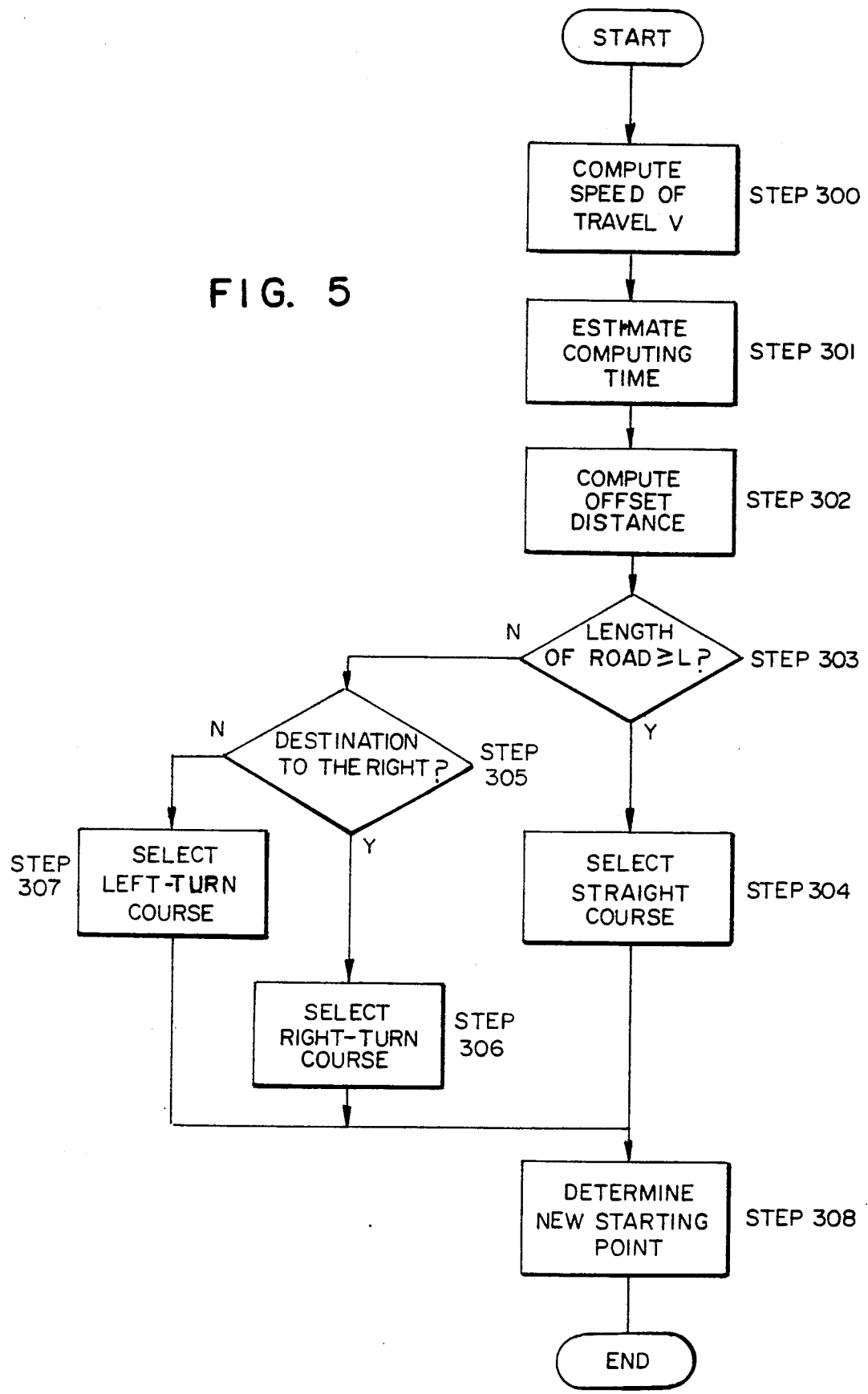
FIG. 5 is a flow chart illustrating selection of the new starting point and the route therefrom after a vehicle's deviation from the original optimal route.

Referring to the flow charts shown in FIGS. 3 through 5, the function of a navigation system having the structure described above is explained hereunder.

FIG. 3 shows a flow chart for computing an optimal route before starting a journey (hereinafter called "the original optimal route"). A program is executed when route computing command unit 26 is turned on after vehicle 10's destination is entered through input device 28.

When the program starts, vehicle 10's present location is read in Step 100. This information may be derived from any one of the devices noted above, or from a combination of these with others. The program then decides whether or not the value in a memory K, which is used exclusively for this purpose, is 0 (Step 101). If K=0, the original optimal route is computed in Step 102. On the other hand, if K≠0, the program ends without computing an original optimal route. In the latter case, an optimal route for the occasion where vehicle 10 is off the original optimal route is computed as described below.

The initial value in memory K is 0. Therefore, when route computing command unit 26 is turned on for the first time after the navigation system starts up, an original optimal route is always computed.

FIG. 4 shows a flow chart for computing local navigation guidance from a starting point to a destination as well as re-computing an optimal route when vehicle 10 is off the original optimal route. The program according to this flow chart is executed at specified time intervals.

When the program starts, vehicle 10's present location is read in (Step 200). Then a decision is made (Step 201) whether or not vehicle 10 is off the optimal route. If the result is negative, that is, when vehicle 10 is on the optimal route, local guidance from the present location is computed in Step 202. The computed guidance is sent to display 38 (Step 203), where it appears as an image the driver of vehicle 10 can follow to his destination.

On the other hand, where vehicle 10 is off the optimal route, the value "1" is written to memory K (Step 204) and display 38 indicates that vehicle 10 is off the optimal route (Step 205). In most cases, messages that vehicle 10 is off the optimal route are written beforehand into the internal memory of microcomputer 36. According to the present embodiment, the system displays a message that reads "You are off the route. Compute the optimal route?", as shown in FIG. 6(B).

Next, in Step 206 a decision is made whether route computing command unit 26 is turned on (i.e., whether a touch-sensitive switch shown in FIG. 6(B) has been pressed). If route computing command unit 26 is not on, the program ends.

If route computing command unit 26 is on, the program determines (Step 207), first, the geographic point that it uses as the new starting point (hereinafter called "the new starting point") when the optimal route is recomputed and, second, the route, from vehicle 10's location when route computing command unit 26 was turned on, to the new starting point.

The new starting point and the route thereto are determined in accordance with the flow chart shown in FIG. 5. After the program starts, a travelling velocity V of vehicle 10 at a present location is calculated (Step 300) based on signals from shaft sensor 32. Then the time T for computing the new optimal route is estimated (Step 301). This estimate may be made based on, for example, the straight-line distance from vehicle 10's present location to the destination. Then distance L from vehicle 10's present location to the new starting point (hereinafter called "offset distance L") is calculated from travelling velocity V and estimated time T according to the equation $$L = V \times T.$$

In the interval of time from the turning on of route computing command unit 26 to the end of recomputing the optimal route, vehicle 10 is expected to move a distance equal to $V \times T$. Therefore, should the actual distance travelled be shorter than offset distance L, vehicle 10 will be off the new optimal route when it has been recomputed. For this reason, offset distance L must be set at a value greater than estimated distance $V \times T$. In the present embodiment, offset distance L is calculated from $V \times T$ either by adding or by multiplying a specified correction factor. In choosing the correction factor, one must allow extra time to take account of the possibility that recomputing time T may be longer than the estimated time.

When offset distance L has been calculated, a decision is made in Step 303 whether the distance from the present location along the road currently being travelled is greater than offset distance L. This decision may be made, for example, in the following manner. A road is divided into a plurality of segments defined by intersections, with the length of each segment stored in map data storage unit 30 before vehicle 10 starts a journey. Then the segments of the road currently being travelled by vehicle 10 are summed from its present location in consecutive order, and the sum is compared with offset distance L. When the sum is greater than offset distance L, vehicle 10's new route is selected to be continuing on the road currently being travelled (Step 305).

On the other hand, should road 14 end at intersection 19 with road 20 (see FIG. 1), where the distance between vehicle 10's present location and intersection 19 is shorter than offset distance L, a decision is made whether the destination is located to the right of intersection 19 (Step 305). If the destination is located to the right of intersection 19, a route calling for a right-hand turn at intersection 19 is selected (Step 306). On the other hand, if the destination is located to the left of intersection 19, a route calling for a left-hand turn at intersection 19 is selected (Step 307).

When the route has been selected as above, the geographic point located on the route and separated from the vehicle's present location by the length of offset distance L is chosen as the new destination. "Geographic point" as used here is not limited to a point location but may also be a road segment.

Referring once more to FIG. 4, when the new starting point and the route thereto have been determined as described above, the program returns to Step 208 of the flow chart in FIG. 4, where navigation guidance from the present location to the new starting point is computed. The computed guidance is sent to display 38 for display.

Referring to FIG. 6, display 38 gives visual guidance to the driver of vehicle 10. According to the present embodiment, where a straight route is selected, a message that reads "You are off the optimal route. Keep going straight" and an arrow indicating "straight ahead" are displayed as shown in FIG. 6(C). In cases where a route which calls for a right turn (or left turn) at intersection 19 has been selected, the message reads "You are off the optimal route. Turn to the right (or left) at the intersection X Km [1.0 Km in FIG. 6(D)]", and an arrow indicating a right (or left) turn is displayed, as shown in FIG. 6(D).

Data for determining a route is written into the internal memory of microcomputer 36 beforehand. Thus, since the data on a particular route is selected from the entire body of data whenever necessary, the greater the amount of data stored in the memory, the more accurate is the guidance displayed.

Referring once more to FIG. 4, following the above steps, the optimal route from the new starting point to the destination is computed (Step 210). When vehicle 10 has followed the route guidance and reached the new destination, normal navigation is resumed. In other words, Steps 202 and 203 are repeated.

Figure 6C:
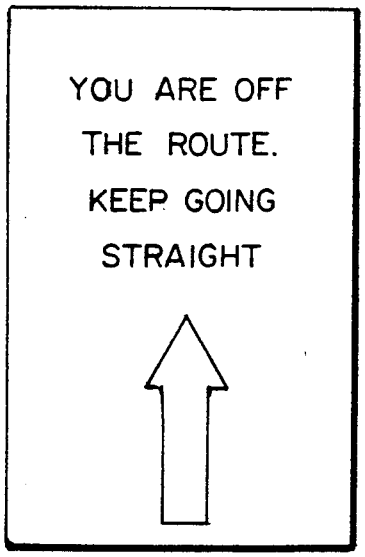
Figure 6D:
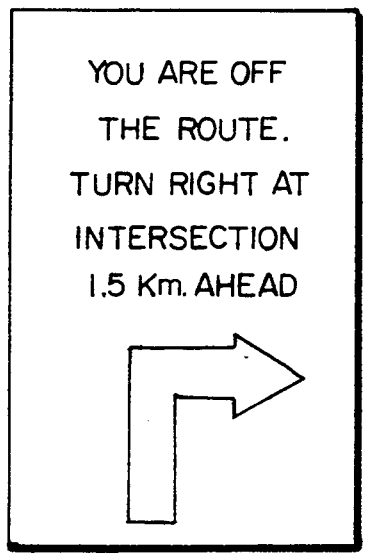

The above explanation refers to the embodiment of claim 1 of the present invention. In the embodiment of claim 2 of the present invention, Steps 204 and 206 shown in FIG. 4 are deleted. In other words, display of the message indicating that a vehicle is off the optimal route (Step 205) and determination of a geographic point and the local route (Step 207) are carried out immediately after the detection of vehicle 10's deviation. As Step 204 is deleted, Step 101 in the flow chart shown in FIG. 3 becomes unnecessary. Likewise, as a result of deletion of Step 206, the message shown in FIG. 6(B) that informs the driver of vehicle 10's deviation is not displayed, and the message shown in either FIG. 6(C) or 6(D) is displayed as soon as the vehicle has deviated from the optimal route.

As explained above, according to a navigation system of the present invention, instead of a vehicle's present location, a geographic point that allows an offset distance becomes the new starting point for computing the new optimal route after vehicle 10 has deviated from the original optimal route. Therefore, there will not be another deviation from the optimal route and a resulting recomputation, once a first recomputation of an optimal route has been made after vehicle 10 has deviated from the original optimal route. Furthermore, navigation guidance from vehicle 10's present location to the new starting point is displayed so that the driver can reach the new starting point without error.

What is claimed is:

1. A vehicle navigation system, which comprises:
   means for storing and retrieving a plurality of map data;
   a shaft sensor;
   a terrestrial magnetism sensor;
   said shaft sensor and said terrestrial magnetism sensor cooperating to detect a present location of a vehicle;
   a microcomputer for computing from said map data an optimal route for said vehicle from a starting point to a destination;
   said shaft sensor, said terrestrial magnetism sensor, and said microcomputer cooperating to detect a deviation of said vehicle from said optimal route;
   a display disposed to convey information that said vehicle has deviated from said optimal route;
   means for commanding computation of a route;
   said means for storing and retrieving and said microcomputer cooperating, in response to said means for commanding, to determine a geographic point separated a predetermined distance from said vehicle's present location and ahead of said vehicle;
   said geographic point providing a new starting point for a calculation of a new optimal route; and
   said microcomputer communicating navigation guidance to said display for presentation thereon.

2. A vehicle navigation system according to claim 1, wherein said means for storing and retrieving includes a CD ROM.

3. A vehicle navigation system according to claim 1, wherein said means for storing and retrieving includes an IC card.

4. A vehicle navigation system according to claim 1, wherein said means for commanding includes a touch screen switch.

5. A vehicle navigation system according to claim 1, wherein said display includes a CRT.

6. A vehicle navigation system according to claim 1, wherein said display includes an LCD.

7. Apparatus according to claim 1, wherein said predetermined distance is sufficient, for a present speed of said vehicle, to permit completion of computation of said new optimum route before said geographic point is reached, whereby said vehicle will not overrun said geographic point before said completion of computation.

* * * * *